US007367578B2

(12) United States Patent
Jansen

(10) Patent No.: US 7,367,578 B2
(45) Date of Patent: May 6, 2008

(54) WHEELCHAIR PROVIDED WITH LEGREST AND CALFREST

(75) Inventor: Martin Jansen, Arnhem (NL)

(73) Assignee: Revab IP B.V., Silvolde (NL)

( * ) Notice: Subject to any disclaimer, the term of this patent is extended or adjusted under 35 U.S.C. 154(b) by 51 days.

(21) Appl. No.: 11/068,492

(22) Filed: Feb. 28, 2005

(65) Prior Publication Data

US 2005/0212255 A1 Sep. 29, 2005

(51) Int. Cl.
*B62M 1/14* (2006.01)

(52) U.S. Cl. .............................. 280/304.1; 297/423.19

(58) Field of Classification Search ............. 280/250.1, 280/304.1, 291; 297/DIG. 4, 423.3, 423.34, 297/423.35, 423.37, 423.19, 423.26, 423.17, 297/423.29

See application file for complete search history.

(56) References Cited

U.S. PATENT DOCUMENTS 2,598,985 A * 6/1952 Everest et al. ......... 297/423.33
3,021,889 A * 2/1962 Mize ....................... 297/423.4
3,212,817 A * 10/1965 Sully ..................... 297/423.37
3,249,388 A 5/1966 Jennings
3,257,148 A * 6/1966 Menuto ................. 297/423.29
3,301,595 A * 1/1967 Jennings, Jr. .......... 297/423.38
3,376,067 A * 4/1968 Kernes .................. 297/423.19
3,863,984 A * 2/1975 Sickels .................. 297/423.17
3,902,758 A 9/1975 Pivacek
3,990,744 A * 11/1976 Rodaway ............... 297/423.29
4,012,074 A * 3/1977 O'Reilly et al. ......... 297/423.3
5,358,266 A * 10/1994 Roth et al. ............... 280/304.1
5,522,644 A * 6/1996 Peek ..................... 297/423.26
5,713,591 A * 2/1998 Zarkhin et al. .......... 280/250.1
6,273,443 B1 * 8/2001 Fleigle .................... 280/304.1

* cited by examiner

*Primary Examiner*—Tony Winner
(74) *Attorney, Agent, or Firm*—Michaelson & Associates; Peter L. Michaelson

(57) ABSTRACT

The invention relates to a legrest for a wheelchair, provided with a footrest and a calfrest. In a first, supporting position (ready for use), this footrest and calfrest are designed for supporting at least a part of a leg of a user seated during use in the wheelchair. The calfrest can be moved to a non-supporting, second position (ready for transfer), wherein the calfrest is located outside the space which is occupied by the legs of a wheelchair user upon sitting down in and/or rising from the wheelchair. The pivotal direction of the calfrest is then such that the path of travel between said first and second position is located substantially outside the space occupied by the legs of the wheelchair user in the first, supporting position.

19 Claims, 3 Drawing Sheets

WHEELCHAIR PROVIDED WITH LEGREST AND CALFREST

BACKGROUND OF THE DISCLOSURE

1. Field of the invention

The invention relates to a wheelchair provided with a legrest, in particular a legrest provided with a calfrest. Such wheelchairs are known.

2. Description of the Prior Art

With the known wheelchairs, the legrest usually comprises a frame part which is connected centrally to the wheelchair or on two sides, and which is provided with a footrest and calfrest, reaching from the frame part as far as in front of a seat of the wheelchair. Such a legrest contributes to a comfortable support of the legs of the user seated in the wheelchair, but upon a transfer of this user in and from the wheelchair it forms an inconvenient obstacle.

It has already been proposed to design the or each legrest to be pivotable so that prior to a transfer, it can temporarily be pivoted sideways. The legs of the user seated in the wheelchair are then to be lifted from of the path of travel of the calfrest pivoting by. This leads to a very uncomfortable sitting posture that requires substantial physical effort from the user and/or his assistant.

SUMMARY Of THE INVENTION

The object of the invention is to provide a wheelchair of the type described in the opening paragraph, wherein the drawback mentioned of the known legrest is avoided, while maintaining its advantages.

With a wheelchair according to the invention, the or each calfrest can be brought from a supporting to a non-supporting position, without traversing the space occupied by the legs of a wheelchair user when this user has placed his feet on the footrest. Consequently, the wheelchair can be readied for a transfer without the wheelchair user needing to take his legs from these footrests, while, accordingly, physical effort and an uncomfortable sitting posture are avoided. Moreover, the wheelchair user and/or his companion have their hands free for operating the calfrests or, optionally, other wheelchair parts. After the calfrests have been removed, the legs of the wheelchair user can be taken from the footrests and be placed on the road surface directly in front of the wheelchair, whereupon the footrests or the legrest in its entirety can be pivoted aside. Naturally, then, the path of travel is once again such that the space occupied by the legs placed on the road surface in front of the wheelchair is not traversed. After the section of road in front of the wheelchair has thus been cleared of obstacles, the wheelchair user can rise from the wheelchair unhindered, with or without the aid of a companion.

In an advantageous embodiment according to the invention, the or each calfrest can be detachably connected to a legrest, for instance by means of a tube clamp, pin hole connection or such lockable or unlockable fastening means. As a result, in cases where support is not (no longer) required or desired, the legrest can simply be detached. Moreover, such an embodiment can simply be designed such that the position of the calfrest on the legrest is adjustable so that the support can be adjusted in a simple manner to various individual desires of a user.

In an alternative advantageous embodiment according to the invention, each calfrest is pivotally connected to the legrest. As a result, the calfrest can be pivoted to a non-supporting position without, to that end, the rest needing to be detached. Hence, disassembly and assembly operations can be avoided and the risk of loss or theft (of separate parts) is limited. Naturally, a combination of the above-mentioned embodiments is possible too, wherein the calfrest is coupled with the legrest by means of a detachable pivot connection.

In a further elaboration, the calfrest comprises a calf plate which is pivotally connected to a frame part of the legrest via an arm construction. Preferably, this arm construction is composed of two arms, connected so as to be mutually pivotable, the first arm being connected to the legrest and the second to the calf plate.

With such an arm construction, the calf plate can be fastened to a legrest of an existing wheelchair in a simple manner, while the arm construction, in particular the orientation of the pivot axis between the two arms, offers the freedom necessary for fastening the calfrest such that it can adequately support the legs of the wheelchair user in the supporting position, and its path of travel to the non-supporting position crosses no wheelchair parts.

In order to further enhance the adjustability, preferably, at least one of the arms of the arm construction is length-adjustable. Further, the second arm, to which the calf plate is attached is preferably pivotable about a second pivot axis, so that an angle between the supporting surface of the footrest and the calfrest can be varied. In addition, it is preferred that the angle between the legrest in its entirety and the sitting support is adjustable too. These angles can then, for instance, be mutually coupled and/or be coupled to the position of the sitting support and/or to the angle between the back supporting part and a bottom supporting part, for instance by means of a rod mechanism.

In a particularly advantageous embodiment, mechanical drive means are provided with which the calfrest can be moved (semi)automatically between the supporting position, ready for use, and the non-supporting position, ready for transfer. For instance, biasing means can be provided which, when the calfrest is in the supporting position, bias the calfrest to the position ready for transfer. By activating the biasing means (for instance by lifting a blocking) the calfrest will then be urged by the bias force to the non-supporting position. With such drive means, readying the wheelchair for the purpose of transfer is simplified still further. Naturally, similar drive means can be provided for the or each footrest. Further, suitable blocking means can be provided for securing the calfrest in the supporting position against pivotal movement.

In a further alternative embodiment, the calfrest can be rigidly connected to a frame part of the legrest, and this frame part can be connected to the wheelchair so as to be pivotable such that through pivotal movement thereof the calfrest can be swung from its supporting position, away from the leg to be supported. In order to enable the user to leave his feet on the footrest when the calfrest is thus pivoted away, the footrest can either be fastened onto a separate second frame part, or be pivotally connected to the first frame part about a pivot axis which substantially coincides with the pivot axis of the frame part itself so that, with a pivotal movement of the frame part, the footrest can pivot in opposite direction and, ultimately, maintain it supporting position. After the feet of the wheelchair user have been taken from the footrest, the footrests can, for instance, be pivoted aside or be removed otherwise, for instance by uncoupling them.

The invention further relates to a legrest, suitable for use with a sitting support, for instance a wheelchair, and a method for readying a wheelchair according to the invention for a transfer.

BRIEF DESCRIPTION OF THE DRAWINGS

In clarification of the invention, exemplary embodiments of a legrest according to the invention and its operation will be further elucidated with reference to the drawings. In the drawings.

DETAILED DESCRIPTION

Figure 1B:
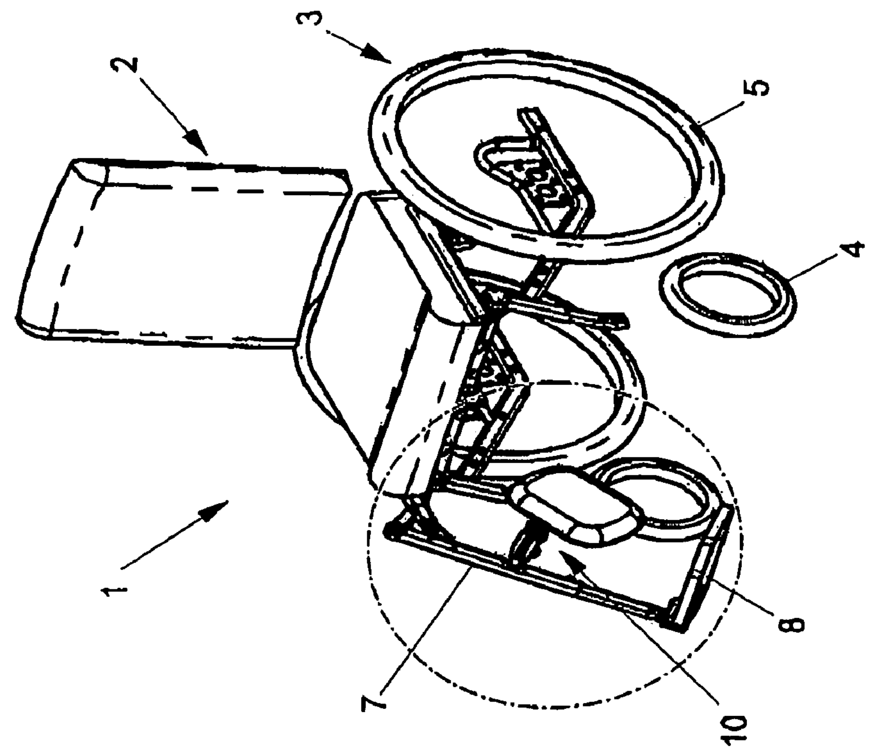
FIG. 1A, B show a wheelchair provided with a calfrest according to the invention in a position ready for use and a position ready for transfer, respectively.
Figure 1A:
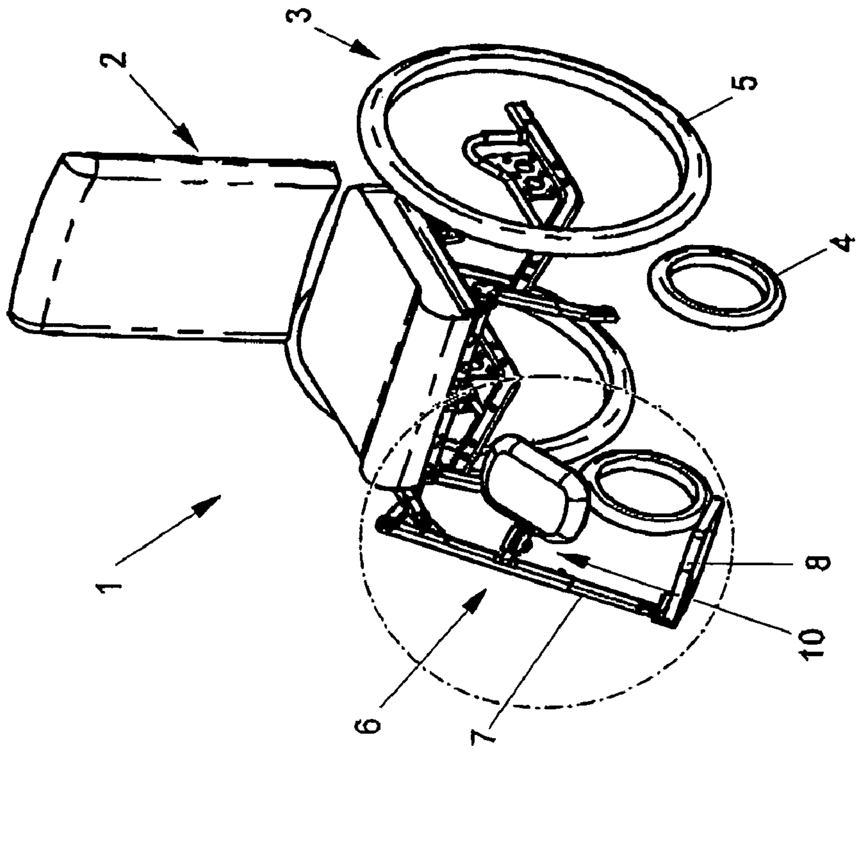

FIGS. 1A, B show a wheelchair 1 according to the invention, comprising a sitting support 2, borne by a wheeled substructure 3, provided with two pivotable front wheels 4 and two drivable rear wheels 5. Naturally, other substructure configurations are possible. The wheelchair 1 further comprises a legrest 6 which is substantially built up from a tubular frame part 7, a footrest 8 and calfrest 10 connected thereto which, in FIG. 1A, assumes a supporting position ready for use and in FIG. 1B, assumes a rearwardly pivoted position, ready for transfer.

The wheelchair 1 shown in FIG. 1A, B comprises one legrest 6, which is fastened to one side of the substructure 3 and which reaches from near a front edge of the sitting support 2, at a downwards inclination, adjacent the road surface. Alternatively, the wheelchair can comprise two legrests 6 (not specifically shown), attached to the two sides of the wheelchair 1, or one central legrest 6 extending in the central longitudinal plane (also not shown) of the wheelchair 1.

Preferably, the frame part 7 is hingedly connected to the substructure 3 about a pivot axis running substantially parallel to the front edge of the sitting support 2 so that an angle β (see FIG. 2A) between the frame part 7 and the sitting surface of the sitting support 2 is adjustable. Depending on the use, this angle β will vary between approximately 90° with an active, straight sitting posture and approximately 180° with a passive, backwardly tilted posture. When not in use, the legrest 6 can be folded about the pivot axis as far as against the bottom side of the sitting support 3, so that a compact, easily transportable wheelchair is obtained. Alternatively, or in addition thereto, the frame part 7 can be provided so as to be pivotable about a substantially vertical axis (not shown) so that, when not in use or during transfer, the legrest 6 can be pivoted sideways as far as against a flank of the wheelchair 1.

Footrests 8 are sufficiently know per se and need therefore not be further described herein. Suffice it to say that preferably, a supporting surface 9 of the footrests 8 is provided with grip enhancing profile to prevent the feet from slipping away. Further, it is preferred that the footrests 8 are pivotally connected to the frame part 7, in a manner to be further described. The calfrest 10 comprises a calf plate 11, which, via an arm construction 12 to be further described, is pivotally connected to the frame part 7 such that the calf plate 11 can be brought from the supporting position shown in FIG. 2A to the position ready for transfer shown in FIG. 2B. Preferably, the calf plate 11 is covered with a layer of relatively soft, resilient material, for instance foam rubber, for a comfortable support of the calf. Moreover, a surface facing the calf during use can be designed to be somewhat concave (not shown) in order to suit the contour of the calf even better, so that this can be well supported over a relatively large surface.

Preferably, further, the calf plate 11 is tiltable about a substantially horizontal pivot axis $S_2$ extending substantially parallel to the front seat edge (see FIG. 2A), so that an angle included between the supporting surfaces 9, 11 of the foot and calfrest 8, 10 is adjustable. As a result, this angle can each time be adjusted per person and sitting situation such that the calves of the user lie against the calf plate 11 when the user's feet rest on the footrest 8. Usually, the angle will be between approximately 90° and 120°, depending on, inter alia, the personal preference of the user, the position of the sitting support 2 and/or the above-mentioned angle β between the legrest 6 and the sitting support 2.

Figure 3:
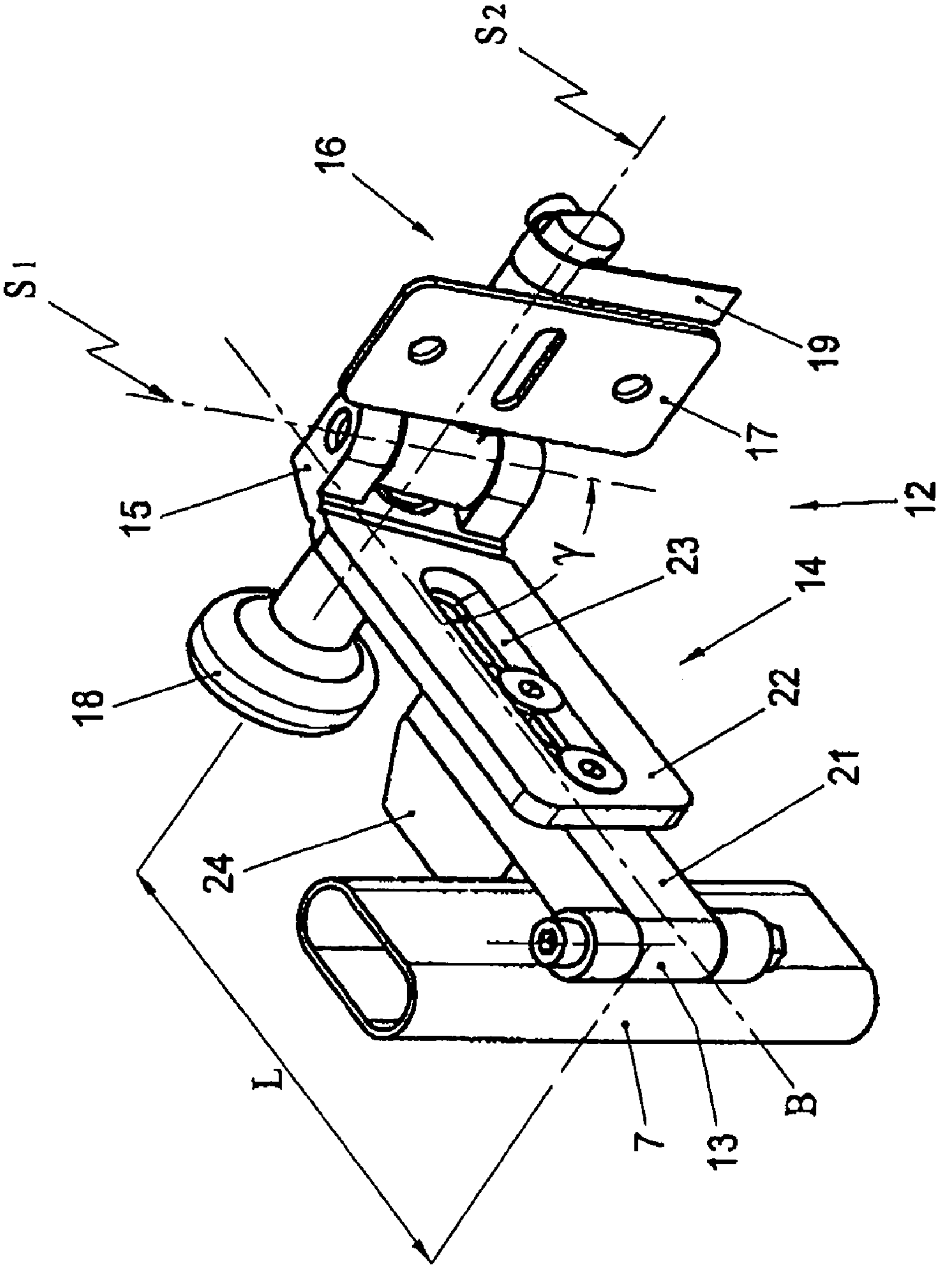
FIG. 3 shows, in further detail, a perspective view of the arm construction of the calfrest according to FIGS. 2A,B.

The structure and operation of the calfrest 10 will now be further elucidated with reference to FIG. 3. In this Figure, a possible embodiment of a calfrest 10 according to the invention is shown, at least a pivot arm construction 12 thereof (for the sake of clarity, the calf plate 11 has been omitted). It is noted that this embodiment is only one of the many possible embodiments and should therefore not be construed to be limitative in any manner.

The arm construction 12 is substantially built up from a length-adjustable first arm 14 and a second arm 16, pivotally connected thereto, which second arm 16 is provided with a fixing plate 17 for mounting the calf plate 11.

The first arm 14 is composed of three parts, i.e. a first arm part 21, a second arm part 22 and a clamp block 24. With the aid of a bolt and nut, the first arm part 21 is attached to an existing hinge 13 on the frame part 7, which hinge 13 was provided for the purpose of an old, forwardly pivoting calfrest. In order to neutralize the hinging action of the hinge 13, a clamp block 24 is fastened against the first arm part 21 such that a somewhat concave end face thereof partially embraces the frame part 7, thereby preventing pivotal movement of the first arm part 21 about the hinge 13. Thus, with relatively simple means (clamp block 24), the calfrest 10 can be fastened to means already present (hinge 13) of the wheelchair 1 without, to that end, the wheelchair itself needing to be adjusted. In addition, the clamp block 24 serves for securing the second arm part 22 against the first arm part 21 in an overlapping manner. Here, owing to a slotted hole 23 in the second arm part 22, the degree of overlap, and hence the total length L of the first arm 14, is adjustable.

The second arm 16 is connected to a extremity of the second arm part 22 via double hinge 15, which allows pivotal movement about two different pivot axes $S_1$, $S_2$, that is a first pivot axis $S_1$, extending substantially in a plane through the frame part 7 and the first arm 14 (see FIGS. 2B and 3), and a second pivot axis $S_2$, substantially coinciding with a central axis of the second arm 16.

Figure 2B:
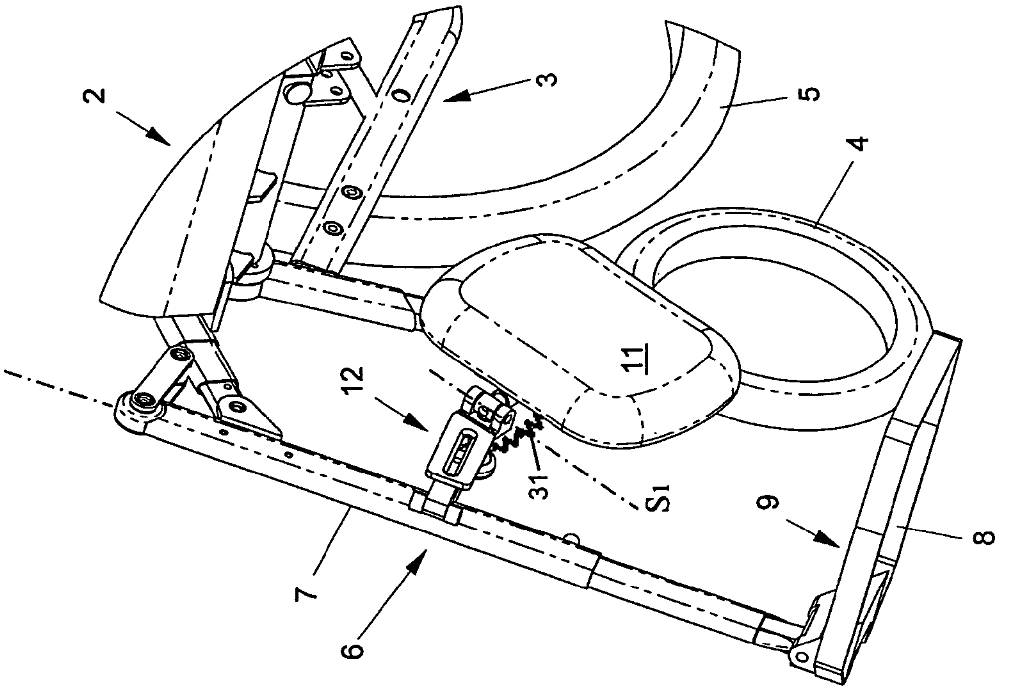
FIG. 2A, B show an enlargement of the calfrest according to FIGS. 1A, B, respectively.
Figure 2A:
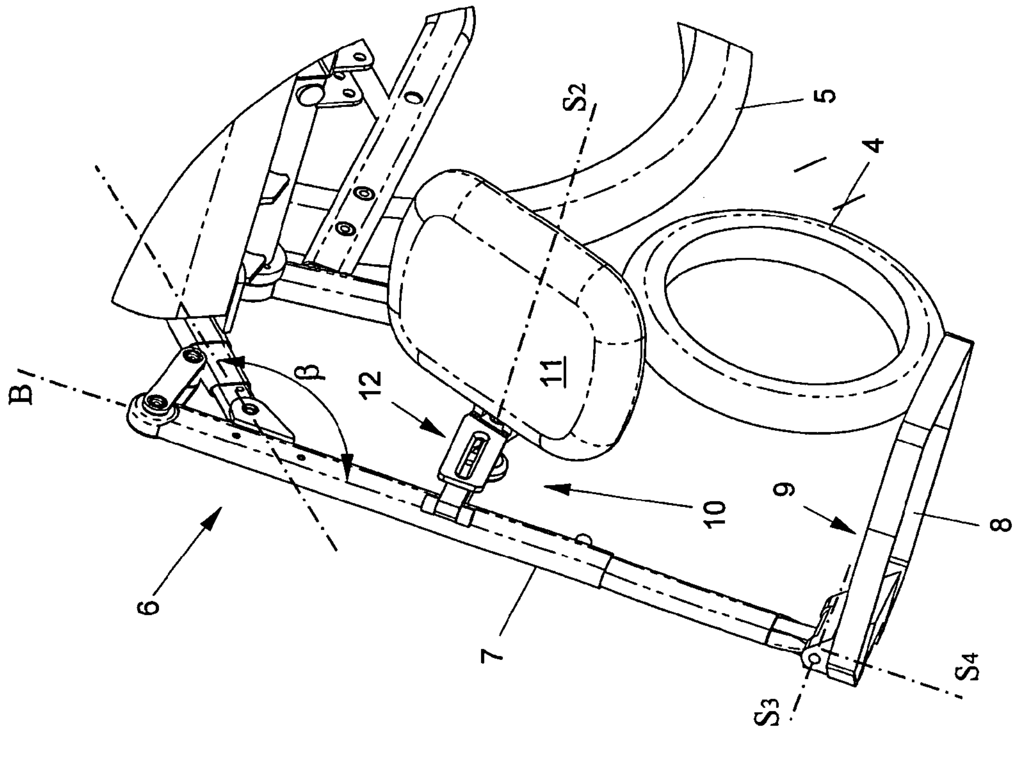

Through a pivotal movement of the second arm 16 about the first pivot axis $S_1$, the calf plate 11 can be brought from the supporting position, ready for use (as shown in FIGS. 1A and 2A) to a non-supporting position, ready for transfer (as shown in FIGS. 1B and 2B). Through a pivotal movement of the second arm 16 about the second pivot axis $S_2$, the above-mentioned angle between the supporting surfaces 9, 11 of the foot and calfrest 8, 10 can be set.

In line with the second arm 16, a control button 18 is provided with which the second arm 16 can be pivoted about the first pivot axis $S_1$. In the control button 18, a locking mechanism is provided, with which the calfrest 10 can be locked in the supporting position (FIGS. 1A, 2A). This locking mechanism can comprise, for instance, a pawl extending substantially parallel to a central axis of the control button 18 and reaching, under the influence of a bias spring, through the hinge 15, thereby preventing rotation about the first pivot axis $S_1$. The locking can be eliminated by pulling out the button 18 (away from the hinge 15) so that the pawl is pulled, against the bias force, from the hinge 15 and the hinge is released for rotation about $S_1$. If desired, a similar construction can also be used for locking rotation about the second pivot axis $S_2$.

Operating the caifrest 10 can take place manually, with the control button 18 as described hereinabove, but can also be effected with the aid of, or supported by electric, mechanical, pneumatic and/or hydraulic drive means. For instance, between frame part 7 and control button 18, biased tension spring(s) 31 (as schematically shown with one end connected to arm construction 12, between the frame and the control button, and the other end connected to the calfrest) can be provided biasing the second arm 16 to the transfer position, while the arm 16 extends substantially in line with the first arm 14.

The rotation of the second arm 16 about the second pivot axis $S_2$ takes place freely, due to the weight of the calves of a user resting, during use, against the plate 11. As a result, the calf plate 11 will each time assume the desired position, while the calves are optimally supported. Further, a leaf spring 19 is provided which, when no forces are applied to calf plate 11 (for instance in the position ready for transfer of FIGS. 1B, 2B) urges the calf plate back in a predetermined position, in which position the calf plate (11) does not hinder the other parts of the substructure 3.

The first pivot axis $S_1$ extends at an angle $\gamma$ relative to the central axis B of the first arm 14 (see FIG. 3), which angle $\gamma$, in the exemplary embodiment shown, is smaller than 90°. Through the selection of this angle $\gamma$, direct influence is exerted on the course of the path of travel of the second arm 16 with the calf plate 11 about $S_1$. By varying the angle $\gamma$, the path of travel can be shifted such that it does not run into parts of the wheelchair 1, in particular the interior works of the substructure 3. It will be clear that the most suitable angle $\gamma$ differs per wheelchair, depending on its configuration, in particular of the substructure 3. In practice, the most suitable angle $\gamma$ will vary between approximately 45° and 90° or even slightly more than 90°, for instance 100° to 120°.

A wheelchair 1 provided with the above-described legrest 6 can be used as follows. FIG. 1A shows the wheelchair in a position ready for use. In this position, the legs of a user seated in the wheelchair are supported by the legrest 6, in particular the footrest 8 and the calfrest 10. When the user wants to rise from the wheelchair 1, the second arm 16 (see FIG. 3) can be pivoted about the first pivot axis $S_1$ with the aid of control button 18, until the central axes of the two arms 14, 16 extend approximately in the same plane. Viewed in the main driving direction of the wheelchair 1, the calf plate 11 will then pivot slightly rearwards and downwards (see FIGS. 1B and 2B). Then, the legs of the wheelchair user 8 can be taken from the footrests 8 and be placed on the road surface in front of the wheelchair 1, whereupon the footrests 8 can be pivoted out of the way, for instance about a third pivot axis $S_3$ (see FIG. 2A), while the footrests 8 are pivoted upwards against the frame part 7, or about a fourth pivot axis $S_4$ (see FIG. 2A) wherein the footrests 8 are pivoted sideways, in a plane extending substantially at right angles to a central axis of frame part 7. With this, the section of road in front of the sitting support 2 is clear of obstacles and the wheelchair user can rise from or be helped up from the wheelchair 1. Upon sitting down in the wheelchair, the above-mentioned steps can be traversed in reverse order.

Accordingly, the wheelchair 1 can be readied for a transfer in a simple manner, without a wheelchair user experiencing any hindrance or needing to assume an uncomfortable position.

The invention is not limited in any manner to the exemplary embodiments represented in the description and the drawings. Many variations thereon are possible within the framework of the invention as outlined by the claims.

For instance, the legrest can be length-adjustable, for instance with the aid of a telescopically slideable frame part, so that the legrest can be tailored to the length of the leg of a user. Preferably, the position of the calfrest along the frame part is adjustable too, for instance by means of a lockable sliding coupling, so that the calf can always be supported at a suitable position. Naturally, it is also possible to support the leg in several places, for instance adjacent a knee or thigh. To that end, the legrest can be provided with additional supporting means, which can be coupled to the frame part in a comparable manner as described for the calfrest and hence are moveable between a supporting position ready for use and a non-supporting position, ready for transfer. Furthermore, a legrest according to the invention is not limited to the use with wheelchairs but can also be advantageously used with other sitting supports with which additional leg support is desired.

These and many variations are understood to fall within the framework of the invention as set forth in the following claims.

The invention claimed is:

1. A wheelchair provided with a legrest, comprising a frame part and, connected thereto, a footrest and a calfrest which, in a supporting first position are designed for supporting at least a part of a leg of a user seated during use in the wheelchair, the wheelchair also having a sitting support, wherein when the calfrest is in said first position a space is defined by a first plane extending vertically downward from a front edge of the sitting support and two parallel second planes extending downward and perpendicular to said first plane and each along a corresponding one of two opposite outer edges of said calfrest such that, while the user is seated on the sitting support, the leg part is supported within the space and by the calfrest, the calfrest being moveable to a non-supporting second position in which the calfrest is located substantially outside the space, while a path of travel of the calfrest between the first and second positions is substantially located behind a third plane extending along the front edge of the sitting support and between the front edge of the sitting support and a rearward edge of the footrest.

2. A wheelchair according to claim 1, wherein the calfrest is detachably connected to the wheelchair.

3. A wheelchair according to claim 1, wherein the calfrest is pivotally connected to the wheelchair.

4. A wheelchair according to claim 1, wherein the calfrest comprises a calf plate and an arm construction, while the calf plate is pivotally connected to the frame part of the legrest via the arm construction.

5. A wheelchair according to claim 4, wherein the arm construction comprises a first arm and a second arm, the first arm being connected to the frame part and the second arm being connected to the calf plate and wherein the two arms are connected to each other so as to be mutually pivotable about a first pivot axis.

6. A wheelchair according to claim 5, wherein the first pivot axis extends at an angle γ relative to a central axis of the first arm, which angle γ can be between approximately 45° and 120°.

7. A wheelchair according to claim 5, wherein the first and/or the second arm are length-adjustable.

8. A wheelchair according to claim 5, wherein the second arm is also pivotable about a second pivot axis which, in the supporting position of the calfrest, extends substantially horizontally and substantially at right angles to a forward driving direction of the wheelchair, the arrangement being such that through pivotal movement of the second arm about this second pivot axis, an angle between the calf plate connected to this second arm and the footrest is adjustable.

9. A wheelchair according to claim 1, wherein the frame part of the legrest is pivotally connected to the wheelchair.

10. A wheelchair according to claim 1, wherein the footrest is moveable between a first, supporting position and a second, non-supporting position, the footrest being located outside a space occupied by the legs of the wheelchair user during rising from and/or sitting down in the wheelchair.

11. A wheelchair according to claim 1, wherein the footrest is pivotally connected to the frame part.

12. A wheelchair according to claim 1, wherein the footrest is pivotable in a plane extending substantially at right angles to a central axis of the frame part.

13. A wheelchair according to claim 1, wherein the footrest can be pivoted from a first, supporting position, towards the frame part, to a second, nonsupporting position located substantially parallel to this frame part.

14. A wheelchair according to claim 1, wherein mechanical drive means are provided for moving the calfrest and/or the footrest between the first, supporting position to the second, non-supporting position.

15. A wheelchair according to claim 14, wherein the drive means comprise a biasing spring, which biases the caifrest and/or the footrest to the second, non-supporting position.

16. A wheelchair according to claim 1, wherein blocking means are provided for blocking the calfrest in the supporting first position against pivotal movement.

17. A legrest with the features according to claim 1, suitable for use with a sitting support.

18. A method for readying a wheelchair according to claim 1, for the purpose of a transfer from the wheelchair of the user seated therein, wherein the calfrest is moved from the supporting position to the second non-supporting position, while the part of the leg of the user rests on the footrest, whereupon the leg of the user is taken from the footrest and is placed on the road surface in front of the wheelchair and the footrest is moved to a second, non-supporting position.

19. A wheelchair having a forward driving direction and being provided with a legrest, comprising a frame part and, connected thereto, a footrest and a calfrest, which in a supporting first position the caifrest supports a part of a leg of a user seated in the wheelchair, wherein the calfrest is movable from the first position to a non-supporting second position, the second position being oriented in a direction at least partly opposite said forward driving direction.

* * * * *